3,205,914
COATED LAMINATE
Hadden Clark, Plainfield, William H. Haslett, Jr., Roselle, and Raymond P. McKernan, Elizabeth, N.J., assignors to Esso Research and Engineering Company, a corporation of Delaware
No Drawing. Filed Mar. 27, 1959, Ser. No. 802,296
19 Claims. (Cl. 138—137)

This invention relates to coated laminates and more particularly to a water-resistant laminated structure of alternate plies of a synthetic polymer oil of a $C_4$ to $C_8$ diolefin and a reinforcing agent such as glass fibers, said laminated structure being coated with a $C_2$ to $C_{12}$ thermoplastic polyolefin, the composite formed having been co-cured at an elevated temperature to resinify the polymer oil, cross-link the polyolefin and simultaneously adhere the glass fibers therein.

It is known that a laminated structure may be produced comprising a glass-reinforced plastic by forming alternate plies of a resinifiable polymer oil of a $C_4$ to $C_8$ diolefin and glass fibers, strands, filaments, threads, cloth or fabric by curing the laminate formed at an elevated temperature, preferably in the presence of an admixture of a major proportion of a cross linking monomer such as vinyl aromatic hydrocarbon or halogen-containing vinyl aromatic and a minor proportion of a peroxide catalyst such as ditertiary butyl peroxide and/or preferably dicumyl peroxide. However such laminated structures have not been resistant to water, especially hot water.

In accordance with the present invention, the above disadvantage is overcome and water-resistant laminated structures obtained by coating the outer surfaces of a composite of alternate plies of glass and diolefin polymer oil with a thermoplastic $C_2$ to $C_{12}$ polyolefin and co-curing the resulting polymers in the coated structure at about 225° to 450° F., advantageously at about 250° to 400° F. and preferably at about 275° to 350° F. for about 5 minutes to 3 hours, preferably for about 20 to 100 minutes. The resulting laminated structure thus comprises a top lamina of cured $C_2$ to $C_{12}$ polyolefin, intermediate laminae of glass and resinified diolefin polymer oil, and a bottom lamina of cured $C_2$ to $C_{12}$ polyolefin, wherein each lamina may vary in thickness from about 0.1 mil to about ½ inch, advantageously from about 0.5 mil to about ⅓ inch, and preferably from 2 mils to about ¼ inch. The co-curing may be with or without simultaneous pressure upon the laminate, such as 0 to 5000 p.s.i., advantageously 5 to 1000 p.s.i. and preferably about 30 to 500 p.s.i.

Resinifiable diolefin polymer oils, within the purview of the present invention, comprise the oils obtained by polymerizing conjugated diolefins having 4 to 8 carbon atoms per molecule. The synthetic polymeric oil may be prepared by mass polymerization (either in the presence of a hydrocarbon soluble peroxide catalyst or in the presence of metallic sodium) of diolefins, particularly those having 4 to 6 carbon atoms per molecule, such as butadiene, isoprene, dimethyl butadiene, piperylene, and methyl pentadiene. Diolefins copolymerized with minor amounts of ethylenically unsaturated monomers such as styrene, acrylonitrile, methyl vinyl ketone, or with styrenes having alkyl group substituted on the ring (paramethyl styrene, dimethyl styrene, etc.), may also be used.

An especially preferred polymeric oil is one prepared by reacting about 75 to 100 parts by weight of butadiene and about 25 to 0 parts by weight of styrene in the presence of an alkali metal such as metallic sodium as catalyst. Polymerization is carried out in a reaction diluent at temperatures from about 15° C. to about 120° C., preferably at about 25° C. to 100° C. with about 0.2 to 8.0, preferably about 0.5 to 5.0 parts by weight of finely divided potassium and/or especially sodium per 100 parts of monomers used. The diluent used in the polymerization should boil between about −30° C. and +200° C., and is employed in amounts ranging from about 50 to 800, preferably about 100 to 500 parts per 100 parts of monomers. The preferred diluents comprise aliphatic hydrocarbons such as hexane, heptane, cyclohexane, isooctane, solvent naphtha or straight-run mineral spirits such as Varsol, etc. In order to obtain a water-white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers being dioxane-1,4 and/or diethyl ether. It is also beneficial to employ about 1 to 80, preferably about 5 to 35 weight percent (based on sodium) of an alcohol such as methanol, isopropanol, or an amyl alcohol. The resulting product may vary in viscosity from about 0.10 to 30, preferably about 0.15 to 20 poises (measured at 50% NVM in Varsol), and may be altered as desired for use in the curable liquid mix. The preparation of this oil is described in U.S. Patent 2,762,851 which is incorporated herein by reference.

The resinification of this diolefin polymer oil is advantageously performed at 225° to 400° F. in the presence of (per 100 parts by weight of oil) about 0 to 150, preferably about 20 to 50 or 100 parts by weight of a cross-linking vinyl aromatic monomer such as vinyl toluene, styrene, alkyl styrenes, halo-styrenes, vinyl naphthalene and about 1 to 15, preferably about 2 to 10 parts by weight of a peroxide catalyst, preferably ditertiary butyl peroxide and/or especially dicumyl peroxide.

For the purpose of the present invention, the thermoplastic polyolefin, to be coated on the exterior surfaces of the laminated structure and cured thereon, may be derived by polymerization of a monomer containing about 2 to 12, preferably about 2 to 8 atoms per molecule, e.g. polypropylene, polybutene, polyhepten, and/or especially polyethylene or the like. The polyolefin may be prepared by any known method. A suitable method is the polymerization of ethylene at low pressures, e.g., 0 to 500 p.s.i.g., and low temperature, e.g., 0 to 100° C., in the presence of a catalyst. The catalysts used in this polymerization reaction are solid, insoluble reaction products obtained by reducing a reducible heavy transition metal compound, the metal component of which is taken from Groups IVB, VIB or VIII, or manganese with a reducing organometallic compound of an alkali, alkaline earth, rare earth, or zinc metal compound. The catalyst may also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.1 to 10, preferably about 0.2 to 6 moles of an aluminum trialkyl such as either aluminum triethyl and/or aluminum triisobutyl or other aluminum alkyl compound of the formula RR′AlX wherein R, R′ and X preferably are alkyl groups having from about 2 to 8 carbon atoms, although X may be hydrogen or halogen, preferably chlorine. In addition to the catalyst, an inert hydrocarbon solvent, which is preferably a $C_3$ to $C_{18}$ paraffin, e.g., isopentane, n-heptane, and the like, may be used in the polymerization. The end product, e.g., polyethylene, generally has a molecular weight in the range of about 2,000 to about 1,000,000, preferably about 5,000 to 500,000 or more. Many of these polyolefins are thermoplastic homopolymers and are discussed in detail in the Belgian Patent 533,362; Chemical and Engineering News, April 8, 1957, pages 12 to 16; and Petroleum Refiner, December 1956, pages 191 through 196, the subject matter of which is incorporated herein by reference. The thermoplastic polyolefin is advantageously compounded with 0 to 10 wt. percent, preferably about 0 to 5 wt. percent of a peroxide catalyst such as ditertiary butyl peroxide and/or especially dicumyl peroxide, prior to co-curing with the resinifiable diolefin polymer oil.

The lamination may be accomplished by any known method. One method used in the manufacture of solid sheets, is to form layers of curable diolefin polymer oil and glass cloth. After the desired thickness is obtained, the sheet is coated on both sides with a $C_2$ to $C_{12}$ thermoplastic polyolefin and co-cured to a unitary water-resistant reinforced plastic. A second method may be used for the manufacture of cylindrical hollow pipes. Glass fibers may be dipped in the curable diolefin polymer oil and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S. Patent 2,714,414). After the desired shape is obtained, the cylindrical laminate formed is coated on the interior and/or the exterior with a $C_2$ to $C_{12}$ thermoplastic polyolefin and co-cured to form a unitary water-resistant rigid pipe. A suitable, but not the only, method is by baking in a press mold at a temperature range of 225° to 400° F. for between 5 minutes and 2 hours under pressures from 0 to 2000 p.s.i.g., preferably 5 to 500 p.s.i.g. It may also be advantageous to have a postcure at between about 280° and 350° F. for about 0.5 to 24 hours or more.

In order to more fully illustrate the present invention, the following experimental data are given:

*Example I*

A butadiene-styrene copolymer oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene, 100 K.B. value, n-heptane, 25.4 K.B. value).
[2] Dispersed to a particle size of 30 microns (±20 microns) by means of an Eppenbach homo-mixer.

The polymerization of this charge was carried out at 50° C. in a 2-liter autoclave provided with a mechanical agitator. Complete conversion was obtained in 4.5 hours. The catalyst was destroyed by means of clay treating and removed from the resulting crude product. Then essentially all of the solvent was removed by stripping to give a product of essentially 100% NVM. The resulting product had a viscosity of 1.5 poises at 50% NVM in Varsol solution and the nonvolatile portion thereof had an average molecular weight equivalent to a viscosity of 8000 poises.

A laminate was made by forming a resinifiable admixture of 50 parts by weight of the foregoing copolymer oil, 50 parts by weight of vinyl toluene, and 4.0 parts by weight of dicumyl peroxide. Twelve plies (each having a thickness of 8.5 mils) of 181 weave glass cloth (136 finish) were saturated with the above mixture and sandwiched between two strips of polyethylene (18 mil thickness) having a molecular weight of 80,000 in accordance with the present invention.

The composite was placed in a mold and the copolymer oil and polyethylene co-cured for 60 minutes at 300° F. under 300 p.s.i. The laminate formed was removed from the press and allowed to cool. It was then submersed in boiling water for 24 hours and the coating did not separate from the remainder of the laminate. Also its flexural strength before and after boiling did not change.

*Example II*

The same general procedure as in Example I was repeated except the polyethylene contained 2.0 wt. percent dicumyl peroxide as catalyst, with the same results upon immersion in boiling water for 24 hours.

*Example III*

The same general procedure as in Example I was again repeated except the polyethylene contained 4.0 wt. percent dicumyl peroxide, with the same results upon immersion in boiling water for 24 hours.

Resort may be had to modifications and variations of the disclosed embodiments without departing from the spirit of the invention or the scope of the appended claims.

What is claimed is:

1. An improved water-resistant reinforced laminate comprising a thermosetting resin and a reinforcing agent; said resin being prepared from a liquid polymer of a $C_4$ to $C_8$ conjugated diolefin; said laminate having a protective layer coated contiguously thereon comprising an uncured thermoplastic polyolefin prepared from a $C_2$ to $C_{15}$ monoolefinic monomer; said resin and said polyolefin having been co-cured with at least the thermosetting resin containing a peroxide catalyst during the co-curing.

2. A laminate according to claim 1 in which the polymeric ingredients therein have been co-cured at about 225° to 450° F. for about 5 minutes to 3 hours.

3. A laminate according to claim 2 in which the co-curing has been accomplished in the presence of about 20 to 150 weight percent of a cross-linking vinyl aromatic monomer selected from the group consisting of vinyl toluene, styrene, an alkyl styrene, a halo-styrene, and vinyl naphthalene and about 1 to 15 weight percent of a peroxide catalyst.

4. A laminate according to claim 3 in which the cross-linking vinyl aromatic monomer is vinyl toluene.

5. A laminate according to claim 3 in which the peroxide catalyst is selected from the group consisting of ditertiary butyl peroxide, dicumyl peroxide and mixtures thereof.

6. An improved water-resistant reinforced laminate comprising a thermosetting resin and glass fibers; said resin being prepared from a liquid polymer of $C_4$ to $C_6$ conjugated diolefin selected from the group consisting of a homopolymer of butadiene, a copolymer of butadiene with styrene, and mixtures thereof; said laminate having a protective layer coated contiguously thereon comprising an uncured homopolymer of a monoolefinically unsaturated monomer having from 2 to 12 carbon atoms; said resin and said homopolymer of a monoolefinically unsaturated monomer having been co-cured with at least the thermosetting resin containing a peroxide catalyst during the co-curing.

7. A laminate according to claim 6 in which the polymeric ingredients have been co-cured in the presence of a peroxide catalyst at about 250° to 400° F. for about 20 to 100 minutes.

8. A laminate according to claim 6 in which the butadiene containing polymer has been cured in the presence of about 20 to 50 weight percent of a cross-linking vinyl aromatic monomer selected from the group consisting of vinyl toluene, styrene, an alkyl styrene, a halo-styrene, and vinyl naphthalene.

9. A laminate according to claim 7 in which the peroxide catalyst is selected from the group consisting of dicumyl peroxide, ditertiary butyl peroxide, and mixtures thereof.

10. An improved reinforced water resistant laminate comprising a thermosetting resin and glass fibers; said resin comprising about 30 to 80 parts by weight of a liquid polymer of about 75 to 100% butadiene and about 25 to 0% styrene which has been reacted with about 20 to 60 parts by weight of vinyl toluene; said laminate having a protective layer coated contiguously thereon comprising an uncured polyethylene; said resin and said polyethylene having been co-cured with at least the thermosetting resin containing a peroxide catalyst during the co-curing.

11. A laminate according to claim 10 in which the polymeric ingredients have been co-cured in the presence of about 0.2 to 10 weight percent of dicumyl peroxide at about 275° to 350° F. for between about 5 minutes to 3 hours.

12. A water-resistant laminated structure comprising alternate layers of a thermosetting resin derived from a liquid polymer of a $C_4$ to $C_6$ conjugated diolefin and glass fibers; said laminated structure having a protective layer coated contiguously thereon comprising an uncured thermoplastic polyolefin selected from the group consisting of polyethylene, polypropylene, and mixtures thereof; said resin and said polyolefin having been co-cured with at least the thermosetting resin containing a peroxide catalyst during the co-curing.

13. A laminate according to claim 12 in which the thermoplastic polyolefin is polyethylene.

14. A water-resistant laminated structure comprising alternate layers of a thermosetting resin prepared from a liquid copolymer of butadiene with styrene and a hydrophylic reinforcing agent; said laminated structure having a protective layer coated contiguously thereon comprising an uncured homopolymer of a monoolefinically unsaturated monomer having from 2 to 12 carbon atoms; said resin and said homopolymer of a monoolefinically unsaturated monomer having been co-cured with at least the thermosetting resin containing a peroxide catalyst during the co-curing.

15. A water-resistant fiber reinforced composite comprising alternate layers of fibers and a liquid thermosetting copolymer of a $C_4$ to $C_8$ conjugated diolefin; said composite having been coated contiguously with an uncured polyethylene; said liquid polymer and said polyethylene having been co-cured in the presence of peroxide catalyst at about 225° to 450° F. for about 20 to 100 minutes.

16. A fiber reinforced composite pipe comprising reinforcing fibers laid up circumferentially in superimposed layers to form a peripheral shell of pipe; said fibers having been saturated with a liquid thermosetting polymer of 75 to 100 parts by weight of butadiene and 25 to 0 parts by weight of styrene; both the interior and exterior of said pipe being coated contiguously with an uncured homopolymer of a monoolefinically unsaturated monomer having from 2 to 12 carbon atoms; said thermosetting polymer and said homopolymer of a monoolefinically unsaturated monomer having been co-cured with at least the thermosetting polymer containing a peroxide catalyst during the co-curing.

17. A process for preparing a reinforced laminate from a resinified thermosetting polymer and glass fibers which comprises forming alternate layers of said glass fibers and a resinifiable liquid polymer of about 75 to 100 weight percent of a $C_4$ to $C_6$ conjugated diolefin and about 0 to 25 weight percent of styrene; coating contiguously said formed layers with an uncured homopolymer of a monoolefinically unsaturated monomer having from 2 to 12 carbon atoms; and co-curing both polymeric materials at about 225° to 450° F. for about 5 minutes to 3 hours with at least the resinifiable liquid polymer mix containing a peroxide catalyst during the co-curing.

18. A process according to claim 17 in which the copolymer is blended with about 20 to 50 weight percent based on copolymer of a cross-linking vinyl aromatic monomer selected from the group consisting of vinyl toluene, styrene, an alkyl styrene, a halo-styrene, and vinyl naphthalene prior to co-curing, the co-curing being in the presence of a peroxide catalyst.

19. A process for preparing a composite pipe which comprises forming a cylindrical mass of glass fibers imbedded in a resinifiable liquid thermosetting polymer mixture containing a $C_4$ to $C_6$ conjugated diolefin prepared in the presence of an alkali metal catalyst; coating contiguously the cylinder formed with an uncured polyethylene; and co-curing both polymeric materials in the presence of about 1 to 15 weight percent of a peroxide catalyst at a temperature level of about 225° to 450° F. for a time between about 5 minutes and 3 hours.

References Cited by the Examiner
UNITED STATES PATENTS

| | | | |
|---|---|---|---|
| 2,614,089 | 10/52 | Harrison et al. | 260—45.5 |
| 2,625,499 | 1/53 | Nebesar. | |
| 2,662,044 | 12/53 | Morrison et al. | |
| 2,703,774 | 3/55 | Morrison | 117—126 |
| 2,714,571 | 8/55 | Iron et al. | 117—161 |
| 2,762,851 | 9/56 | Gleason | 260—669 |
| 2,774,698 | 12/56 | Jenk et al. | |
| 2,823,157 | 2/58 | Hofferbert et al. | |
| 2,838,418 | 6/58 | Starkweather | 117—161 |
| 2,862,906 | 12/58 | Stein et al. | |
| 2,936,261 | 5/60 | Cole | 154—43 |

ALEXANDER WYMAN, *Primary Examiner.*

EARL M. BERGERT, CARL F. KRAFFT, *Examiners.*